(12) United States Patent
Shanken et al.

(10) Patent No.: US 8,892,604 B2
(45) Date of Patent: Nov. 18, 2014

(54) PRE-AUDIT SYSTEM, APPARATUS, AND METHOD

(71) Applicant: Lead Intelligence, Inc., Gwynedd Valley, PA (US)

(72) Inventors: Ross Shanken, Gwynedd Valley, PA (US); Atul Patel, Irvine, CA (US); Emanuel I Wald, Laverock, PA (US)

( * ) Notice: Subject to any disclaimer, the term of this patent is extended or adjusted under 35 U.S.C. 154(b) by 0 days.

(21) Appl. No.: 13/925,716

(22) Filed: Jun. 24, 2013

(65) Prior Publication Data

US 2013/0290152 A1    Oct. 31, 2013

Related U.S. Application Data

(63) Continuation of application No. 13/400,872, filed on Feb. 21, 2012, now Pat. No. 8,498,976.

(51) Int. Cl.
*G06F 17/30* (2006.01)
*G06Q 40/00* (2012.01)
*G06F 17/24* (2006.01)
*G06Q 50/18* (2012.01)

(52) U.S. Cl.
CPC ............... *G06Q 40/10* (2013.01); *G06F 17/30* (2013.01); *G06F 17/243* (2013.01); *G06Q 50/188* (2013.01)

USPC ........... 707/791; 707/713; 707/722; 707/802; 707/822; 707/828

(58) Field of Classification Search
CPC ....................................................... G06F 17/30
USPC .................................................. 707/600–899
See application file for complete search history.

(56) References Cited

U.S. PATENT DOCUMENTS 7,577,587 B2 * 8/2009 Gee ............................. 705/26.81
2008/0201204 A1 * 8/2008 Rose et al. ...................... 705/10

OTHER PUBLICATIONS

Isaac M. Woo, "Non-Final Office Action" issued on May 3, 2013 for U.S. Appl. No. 13/400,872.

* cited by examiner

*Primary Examiner* — Isaac M Woo
(74) *Attorney, Agent, or Firm* — LeonardPatel PC

(57) ABSTRACT

A pre-audit system, apparatus, and method is provided to perform a pre-audit of form data. Form data is received from a supplier prior to the form data being delivered to one or more purchasers. The form data is compared with rules or conditions set by the one or more purchasers. A response message is transmitted to the supplier, where the response message includes one or more results and one or more descriptions related to the one or more results.

18 Claims, 6 Drawing Sheets

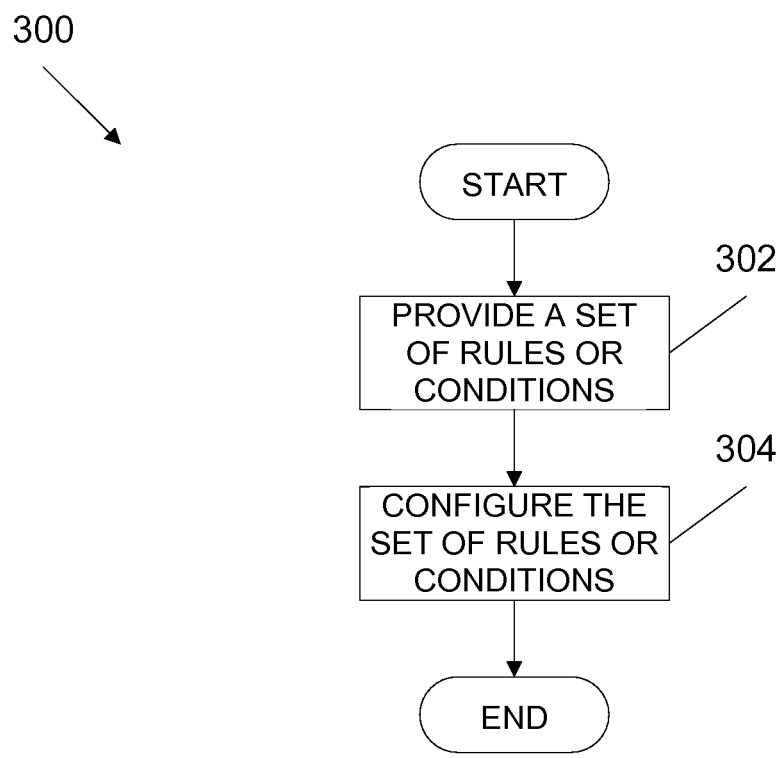

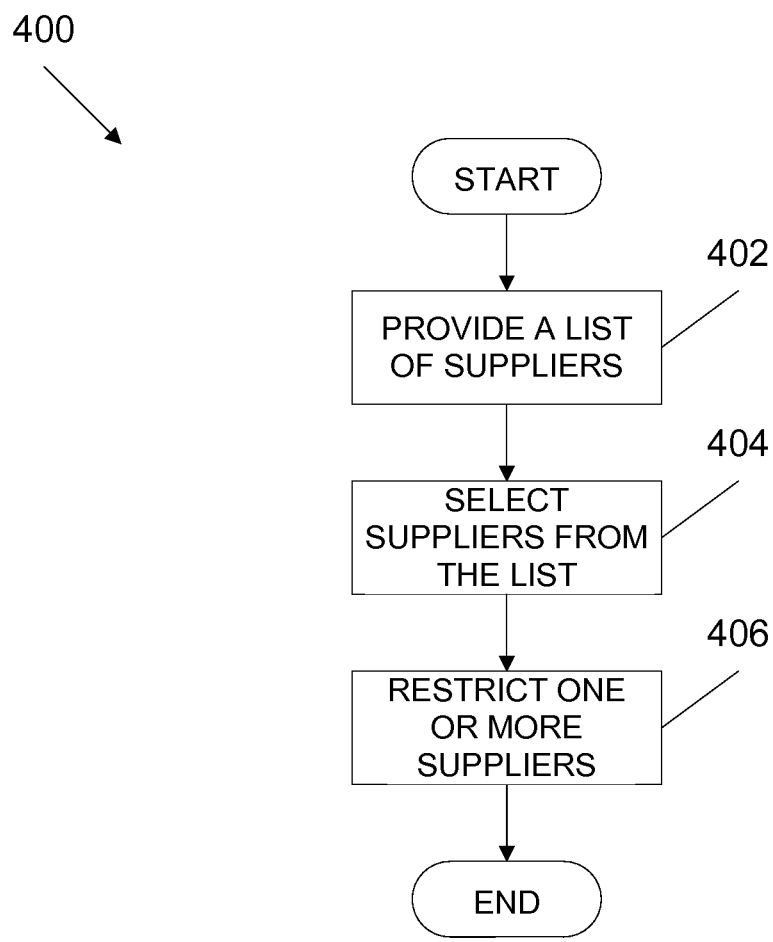

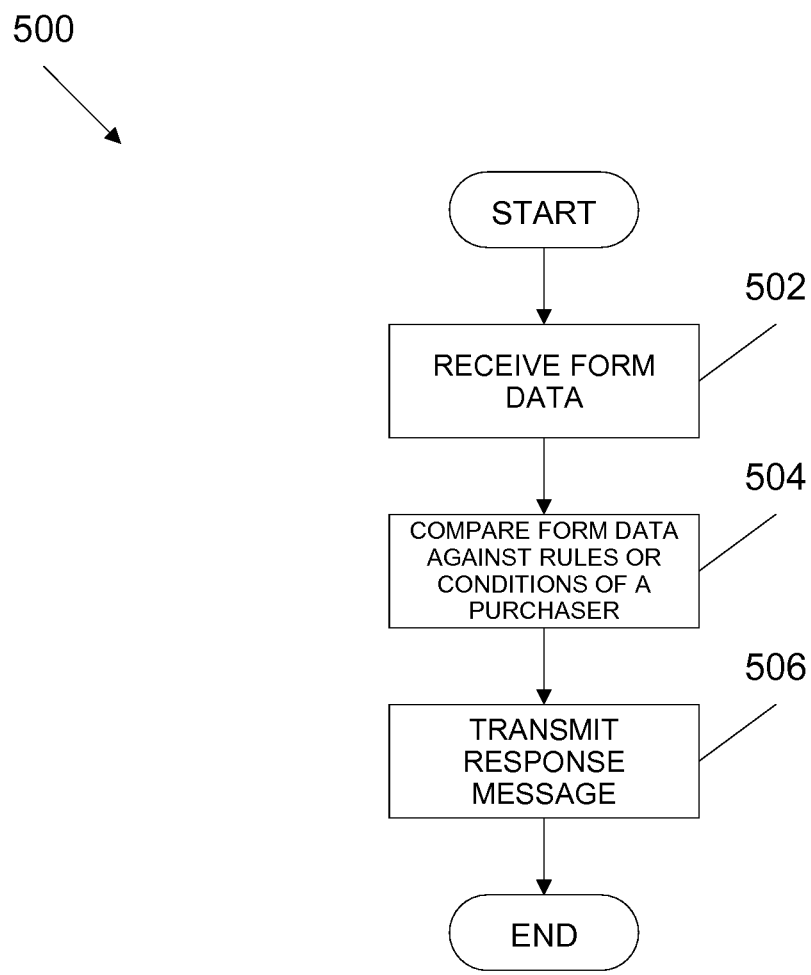

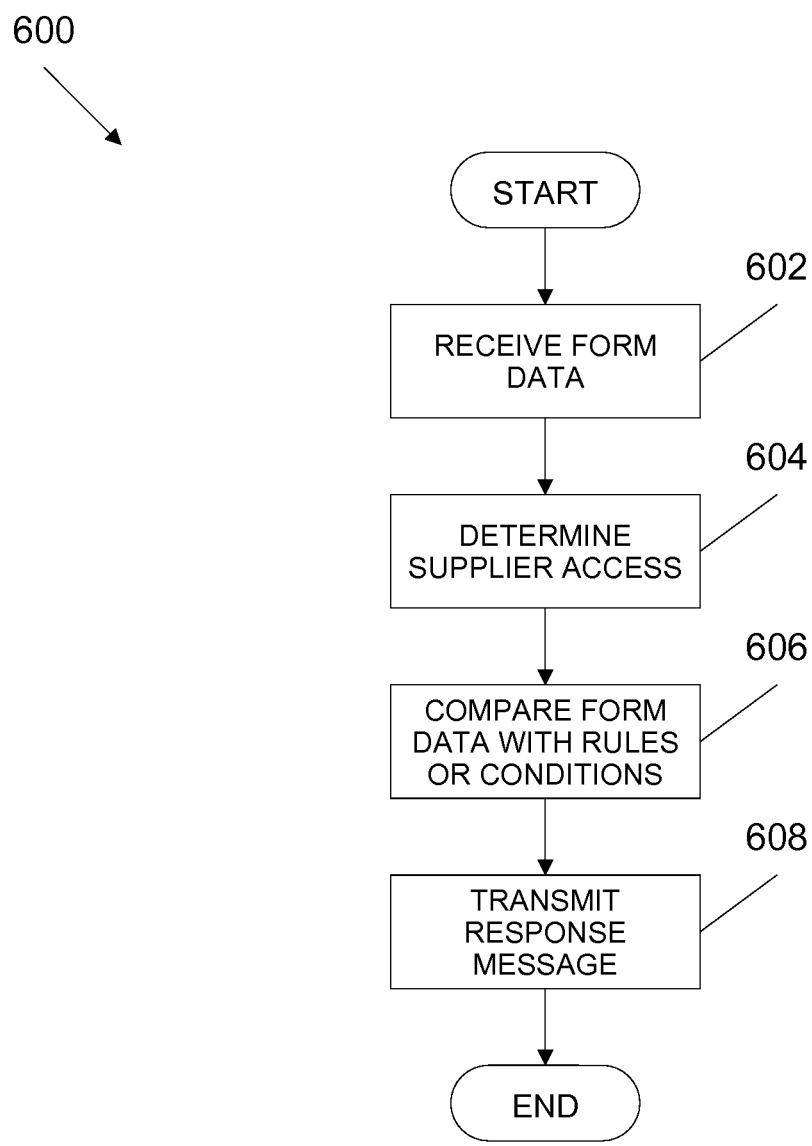

PRE-AUDIT SYSTEM, APPARATUS, AND METHOD

CROSS REFERENCE TO RELATED APPLICATIONS

This non-provisional patent application is a continuation of, and claims priority to, U.S. Non-Provisional patent application Ser. No. 13/400,872, filed Feb. 21, 2012, the subject matter of which is hereby incorporated by reference in its entirety.

FIELD

The present invention relates to pre-auditing form data and, more particularly, to pre-auditing form data before a purchaser receives the form data or without a purchaser ever receiving the form data.

BACKGROUND

Within several industries, parties are often providing data to other parties across a network. Oftentimes, this data is sold from one party to another. Once the data is received, the receiving party (or purchaser) may perform various checks on the data, oftentimes with business rules associated with those checks. The checks may be performed in order to: (1) determine whether to accept the data being presented by the supplying party (or supplier); (2) determine how much the purchaser is willing to pay for the data; (3) derive or gain additional data or intelligence associated with the data presented by the supplier; and (4) determine the best way to route, and/or resource against, the data.

For example, within the online lead generation space, a seller of form data (or lead) sells data to a buyer of the form data that was collected in some manner by the seller of the form data. The buyer of the form data may take any of these actions upon receiving the data: (1) reject the data attempting to be sold based on various reasons; (2) determine how much the purchaser is willing to pay for the data; (3) append other data or intelligence associated with the presented data from the buyer's own databases and/or from a third party data or intelligence provider; and/or (4) expend resources differently based upon various rules, such as electing to place a phone call to an individual represented by the purchased data versus sending an email in order to optimize marketing for the optimal business result.

There are numerous problems with data being passed from a supplier to a purchaser, and following that, having the purchaser perform the checks and apply the rules on the data, before determining what the purchaser is going to do next with the data. The purchaser needs to see the data in order to perform its checks and rules; and if the purchaser rejects the data from the supplier, or similarly, if the purchases offers to pay a certain amount and the seller rejects the offer, after having already been exposed to that data, there is risk to the supplier that the purchaser has maintained a copy of the data and has rejected the data, or intentionally offered a lower amount, in order to not pay for it. Similarly, the purchaser may already have the data in existing databases, and reject the data presented by the supplier due to duplication. Such a scenario allows the purchaser to gain the knowledge from the data, which was represented by the supplier through an attempted sale, and allow the purchaser to act upon the existing database record, while not having utilized the actual data from the supplier to do so. This is possible because the intelligence was derived from the supplied data in order for the supplier to act upon the existing database. The purchaser can also look across its own databases for patterns of the data having been presented previously, thereby not being able to gain intelligence about where the data has existed elsewhere outside of the entity. Similarly, the supplier has the same restrictions, only having purview of its own databases, or databases exposed to the supplier, such as by the purchaser. Purchasers often have unique systems of running data checks and rules that require each purchaser to create and maintain these rules, as well as suppliers to integrate into these rules, which is much less efficient than if a third party utilized a standard methodology, whereby the purchaser would not need to create and maintain its own data checking methodologies, and suppliers would not need to integrate into multiple methodologies across their Purchaser networks.

To make the process of data transfer more efficient, some purchasers have developed systems whereby a supplier can perform a database query to the potential purchaser in order for the supplier to gain knowledge about whether the purchaser wants to accept the data and/or other information that the purchaser wants to deliver back to the supplier about the data being transferred or potentially transferred. This process allows the supplier to gain knowledge almost instantly about the purchaser's intentions, without having to necessarily transfer all the data to the purchaser, and without the purchaser being required to perform all of its checks and apply its business rules on their end, but rather the supplier can develop and maintain the systems to perform those checks and apply business rules. In certain industries, this methodology is referred to as a "pre-ping." However, the same problems as discussed above also exist with the "pre-ping" system.

SUMMARY

Certain embodiments of the present invention may provide solutions to the problems and needs in the art that have not yet been fully identified, appreciated, or solved by current form data auditing systems or "pre-ping" systems.

In accordance with an embodiment of the present invention, a computer-implemented method is provided. The method includes receiving form data from a supplier prior to the data being delivered to a purchaser and comparing the form data with rules or conditions set by the purchaser. The method also includes transmitting a response message to the supplier. The response message includes one or more results and one or more descriptions related to the one or more results.

In yet another embodiment of the present invention, an apparatus is provided. The apparatus includes a processor and memory including a set of instructions. The set of instructions cause the processor to receive form data from a supplier prior to the form data being delivered to one or more purchasers, and compare the form data with rules or conditions set by the one or more purchasers. The set of instructions also cause the processor to transmit a response message to the supplier. The response message includes one or more results and one or more descriptions related to the one or more results.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a method for receiving rules or conditions from a purchaser, in accordance with an embodiment of the present invention.

FIG. 4 illustrates a method for restricting pre-audit access to suppliers, in accordance with an embodiment of the present invention.

FIG. 5 illustrates a method for pre-auditing form data, in accordance with an embodiment of the present invention.

FIG. 6 illustrates a method for pre-auditing form data, in accordance with an embodiment of the present invention.

DETAILED DESCRIPTION OF THE EMBODIMENTS

Figure 1:
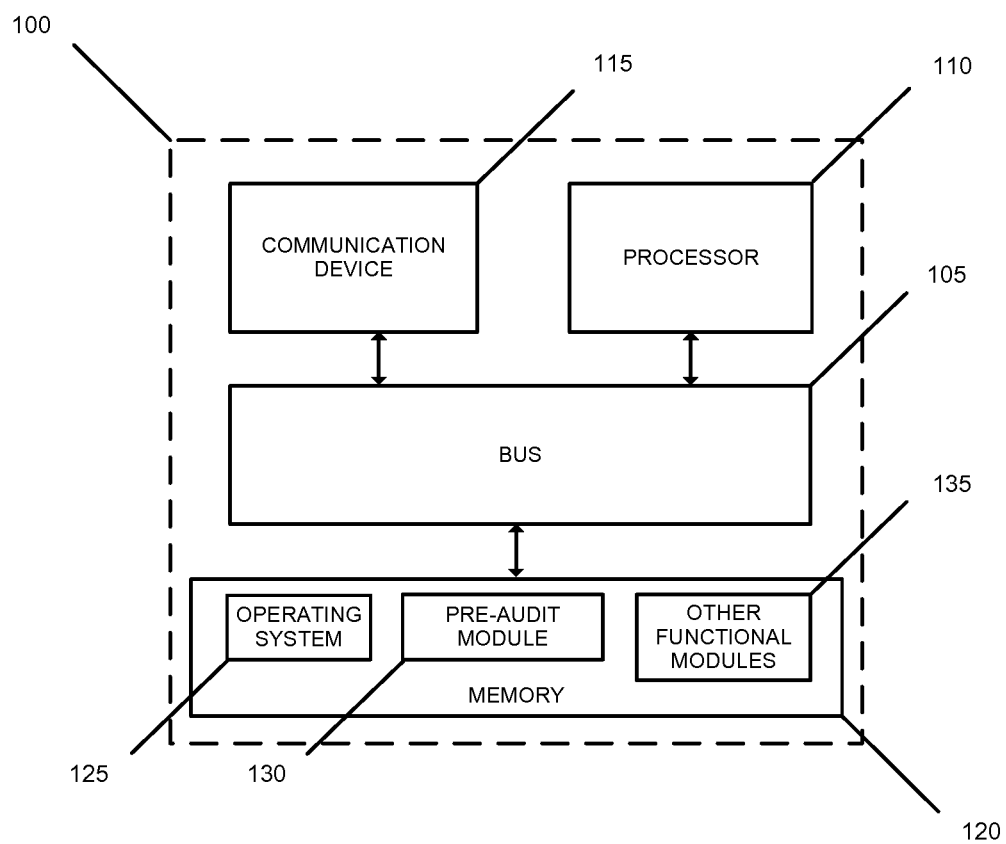
FIG. 1 illustrates a block diagram of a system, in accordance with an embodiment of the present invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein solve the problems that exist with current auditing and pre-ping systems. For example, some embodiments of the system pertain to a system that receives the data from a supplier as an intermediary prior to the data being delivered to the purchaser. The system creates access to, and/or creates sets of duplicate versions of, the purchaser's database, other third party data, as well as rules that the purchaser wants to utilize to determine whether it wants the data, and if so, how much it is willing to pay for the data and how to treat the data once received. The system can accomplish all of this without the purchaser being exposed to the supplier's data, removing the risk for the supplier of its data being utilized by the purchaser without the purchaser paying for the data or without the supplier's knowledge or consent.

The system can review data across its entire network, which includes the intended purchaser's data and all third party data that is utilized, and also includes all parties who may or may not utilize the system. As such, the reach of information and rules associated with the data is significantly broader than the reach of the supplier or the purchaser individually. For example, if a purchaser only wanted to purchase data that hadn't been circulated to more than a certain number of other parties, and the supplier performs a pre-audit and the system indicates that the data has been circulated to more parties than the purchaser wanted, the system would indicate that the intended purchaser does not want to purchase the data, and the system can also supply the reason for this decision back to the supplier. In this example, without such a system, neither the supplier nor the purchaser could have made such a determination.

The system can create a common interface whereby any purchaser can set its own rules to be used globally across all suppliers or individually for specific suppliers or groups of suppliers. Purchasers will provide suppliers with access to query the system based upon designated rules. The system removes the need for suppliers to integrate into multiple purchaser interfaces and rule sets, each with its own interface, and removes the need for purchasers to integrate multiple suppliers, and re-integrate if anything changes. Instead of the conventional setup, the system utilizes a common interface that a supplier can utilize to gain access to multiple purchasers who authorize the access to the supplier, and allows the supplier to query the system with data intended to be sold to the purchaser using a common query interface. The system can then deliver back an answer to the supplier about the purchaser's decision. For the purchaser, the system allows use of a common interface to set the purchaser's rules, as well as change the rules, without having to interface or integrate across the entire supplier base. In other embodiments, when a puchaser has not defined any rules, or the purchaser has not granted a supplier permission to apply its rules, the system can provide the supplier with the ability to indicate to the purchaser its intent to sell the form data to the purchaser, or at a minimum, query the rules of the purchaser with the form data in order to ascertain the disposition of the purchaser with respect to that form data.

FIG. 1 illustrates a block diagram of a system 100, in accordance with an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of non-transitory computer readable medium. System 100 may also include a communication device 115, such as a network interface card, that may provide access to a network.

The non-transitory computer readable medium may be any available media that can be accessed by processor 110. The non-transitory computer readable medium may include both volatile and nonvolatile media, removable and non-removable media, and communication media. The communication media may include computer readable instructions, data structures, program modules, or other data and may include any information delivery media.

According to one embodiment, memory 120 may store software modules that may provide functionality when executed by processor 110. The modules can include an operating system 125 and a pre-audit module 130, as well as other functional modules 135. For example, pre-audit module 130 may allow a seller (or supplier) of form data to determine whether a purchaser (or buyer) will buy the form data prior to the purchaser receiving the form data. Form data may include, but is not limited to, consumer data, consumer selections, consumer actions, and a form identification number. Operating system 125 may provide operating system functionality for system 100. Because system 100 may be part of a larger system, system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
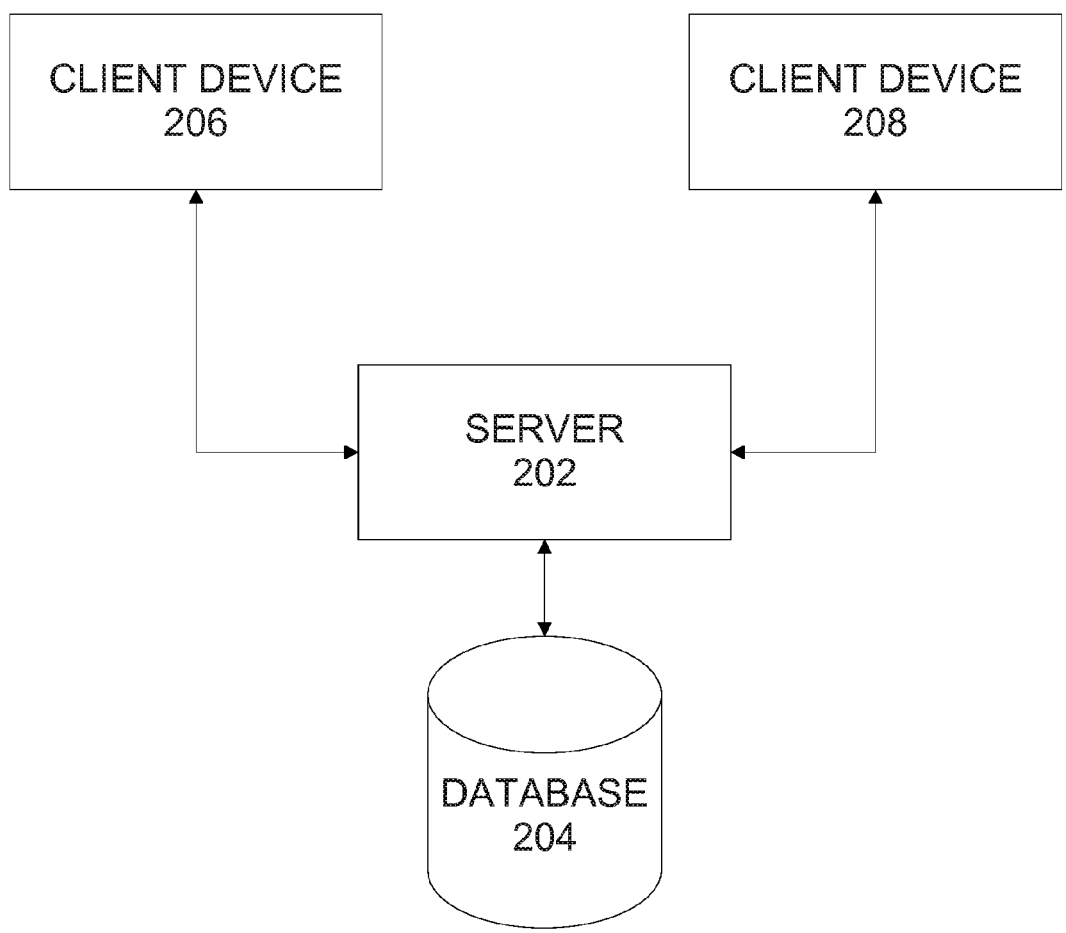
FIG. 2 illustrates a pre-audit system, in accordance with an embodiment of the present invention.

FIG. 2 illustrates a pre-audit system 200, in accordance with an embodiment of the present invention. System 200 includes, for example, a server 202 connected to a database 204 and at least two client devices 206, 208. Server 202 may include the components described in FIG. 1. Client devices 206, 208 can connect to server 202 and/or database 204 via a local area network, a wide area network, the Internet, or any other suitable communication means. It should be appreciated that while FIG. 2 illustrates only two client devices 206, 208, system 200 can include any number of client devices that can connect to server 202 at any given time.

In one or more embodiments, client devices 206, 208 can be suppliers of form data (or leads) and/or purchasers of form data. For purposes of explaining FIG. 2, client device 206 is a supplier and client device 208 is a purchaser in this example. In this embodiment, client device 208 can provide client device 206 with any of the following access levels: (1) no access; (2) access in order to perform a pre-audit, receive results of the pre-audit, and receive the reasons associated with the result; or (3) view-only access to the entire set of rules of client device 208. Depending on the access levels set by client device 208 for client device 206, server 202 may allow client device 206 to conduct a pre-audit (or query) of form data to determine whether client device 208 will purchase or consider purchasing the form data. To make such a determination, server 202 compares the form data from client device 206 with rules or conditions set by client device 208.

It should be noted that each time the form data is pre-audited against a purchaser's rules or conditions, server 202 records the information related to the pre-audit in database 204. The recorded information related to the pre-audit can be associated with a form event, appended to the form data, or associated with an event that created the form data, for future pre-audit purposes or auditing purposes. This allows a purchaser to determine whether a pre-audit was conducted against the rules or conditions set by the purchaser prior to purchasing the form data. This also allows the purchaser to determine whether the purchased form data is legitimate once the purchaser receives the form data from the supplier.

Based on the comparison, server 202 can generate a response message that includes a result, which can be either a positive result or a negative result, along with a description related to the result. The result can be a flag, such as a red flag for a negative result, a yellow flag for caution, and a green flag for a positive result. In this example, a positive result indicates to client device 206 (e.g., supplier) that client device 208 (e.g., purchaser) will purchase the form data, and a negative result indicates to client device 206 that client device 208 will not purchase the form data.

When, for example, the result is negative, server 202 generates a response message that includes the negative result and reasons why the result is negative (or why the client does not want to purchase the form data). The reasons may include that the form data is not authentic, the form data is too old, the form data has integrity issues, the form data has been duplicated, etc. The reasons provided may be generalized and not specific based on the settings by the purchaser or system administrator.

Once the response message is transmitted to client device 206 and, if the response message has a positive result, client device 206 can directly sell the form data to client device 208. In another embodiment, if the response message has a positive result, server 202 can automatically sell the form data to client device 208.

It should be appreciated that client device 208 (e.g., a purchaser) can configure the flags (or a flagging system) to be associated with different results and/or actions. In one embodiment, client device 208 can configure the flags such that each flag provides an indication as to how much money the purchaser is willing to pay based upon the flag. For example, a green flag can mean that the purchaser is willing to pay the supplier's asking price for the form data, a red flag can mean that the purchaser is willing to pay no money or a very small amount of money to purchase the form data, and a yellow flag can mean that the purchaser is willing to pay an amount that is greater than the amount shown under the red flag, but less than the amount shown under the green flag. In other words, client device 208 can assign a quantified amount to each flag set by the client device.

In another embodiment, client device 208 can associate an action with each flag. For example, based on the flag, client device 208 can receive a communication (e.g., an email, text, or any other suitable form of communication) when the form data that client device 206 is trying to sell meets the condition of the flag, or when a certain amount or percentage of audits result in certain flag conditions.

Client device 208 can also configure each flag, such that a communication is transmitted to server 202 or client device 206 to indicate the result of the pre-audit of the form data.

In one or more embodiments, each flag can be configured to be associated with an action and/or description. It should be appreciated that the examples pertaining to the flagging system above do not limit the scope of the invention, and the flagging system may be configured depending on the desired system configuration and/or the purchaser's requirements.

In one or more embodiments, server 202 can pre-load information pertaining to form data in database 204. The form data can include, amongst other information, a form identification number (FIN), FIN creation date, FIN creation time, how many times the form data was sold, the actions that took place when the data was being entered into the form, the device and IP address from which the form data was entered, etc.

Server 202 can also be capable of creating a common interface to allow a purchaser to set its own rules or conditions, as well as change rules or conditions that were previously set. In an alternative embodiment, rules or conditions stored in the client device can be imported or pre-loaded into database 204. The rules or conditions can include, but are not limited to, form data age, form data integrity, form data origin, form data velocity, consumer velocity, form data lineage, form data duplication, form data compliance, form data fraud indicators, form data source, etc.

Form data compliance can include a set of programmable code that, when executed, is configured to cause a processor to track and store information about the page where the programmable code is active. The information that is tracked and stored may include text, images, prominence (size, fonts, etc.) of text that is located on the page, etc. This is useful when a purchaser wants to ensure that certain items are on the webpage (e.g., a certain type of disclaimer) and/or that certain items are not present on the webpage (e.g., "explicit content").

The form data source information can pertain to the source or entity (e.g., form data generator) that was responsible for generating the form. This aspect of some embodiments of the present invention is useful when a purchaser may want to purchase form data only from a certain form data generator or restrict certain form data generators.

Form data age can indicate how old the form data is, within a window of time. If a purchaser (e.g., client device 208) wants to know the precise date and time the form data was generated, client device 208 can access the details of the form data from server 202. This allows client device 208 to set a condition to set a condition that accepts form data that is, for example, no more than a day old, two days old, etc.

Form data integrity indicates to the client device whether the form data that has been transferred is what was actually entered on the form. In other words, this allows client device 208 to set conditions that flag form data differently in cases where the data may have changed from the time when the form data was entered to what the "purchaser" received. Data integrity checks may be performed on any information that was entered by the consumer. For example, personal and/or non-personal information of the consumer may be checked to verify the integrity of the data. The personal or non-personal information may include specific products or services the consumer selected when entering the information in the form. Data integrity allows additional checks to be performed to ensure the entity that generated the information actually represented the correct information within the page.

Form data origin indicates the origin of the form data and whether or not that origin has likelihood of having come from the party who was supposed to enter it. For example, in the online leads space, the usual or authentic event is that a consumer is legitimately interested in a product or service, and that consumer enters his own information into a form. However, there are cases where a person might enter another person's information as form data in order to misrepresent that this normal occurrence had taken place. Alternatively, people may programmatically have information entered into forms in order to misrepresent that this was a consumer legitimately interested in a certain product or service. To certify the originator of the information, server 202 is configured to identify multiple pieces of information related to the device that was utilized to enter the information, as well as the Internet Protocol (IP) address in an Internet environment. This information allows client device 208 to set a condition to flag and describe any form data that has been entered a certain number of times over a certain period of time from a particular device or IP address, as well as other indicators such as likelihood that the information was programmatically entered, as compared to being entered by a human. In other words, client device 208 may flag any form data that has been viewed, for example, five times over the past hour.

Form data velocity can indicate how often the same form data is exposed (or sold) to unique entities. This allows client device 208 to set a condition to flag any form data that has been sold a certain number of times. For example, client device 208 can set a condition that flags any form data that has been sold two times over the past 24 hours, or any time frame that would be appreciated by a person of ordinary skill in the art.

Form data lineage (e.g., the family tree of the form data) indicates the entities that received the form data from the entity that generated it, and other entities that bought the form data from those entities, etc. There are multiple applications for this data, including for example, the ability to allow client device 208 to set a condition to flag any form data (when generated) that was received by a certain number of entities and/or flag form data if the form data has changed hands (or been transferred) a certain number of times between the originator and the purchaser.

Form data duplication indicates whether a certain entity has seen the form data, and if so, indicates when the certain entity has seen the form data. This condition allows client device 208 to set a condition to flag any form data that has been duplicated in other form data and within a certain time period. For example, during pre-auditing, server 202 can search through database 204 and determine whether the data in a form has been duplicated in another form and when the data in the form has been duplicated in the other form. This is possible because database 204 stores information pertaining to each form that was generated, sold, purchased, etc.

In one or more embodiments, the rules or conditions described above can be used globally across all suppliers, individual suppliers, or groups of suppliers. In other words, server 202 allows a purchaser to restrict a supplier, or even groups of suppliers, from performing a pre-audit. For example, server 202 allows a client device to restrict another client device or devices from performing a pre-audit of form data against the rules or conditions of the client device. For instance, if client device 206 does not want client device 208 to run a pre-audit against the rules or conditions set by client device 206, server 202 allows client device 206 to restrict client device 208 from performing a pre-audit.

FIG. 3 illustrates a method 300 for receiving rules or conditions from a client, in accordance with an embodiment of the present invention. The server of FIG. 2 or pre-audit module of FIG. 1 can be configured to execute the method steps shown in FIG. 3 in some embodiments. At 302, a server provides a client device (or purchaser) with a set of rules or conditions (or flags) that can be set by the purchaser. At 304, the purchaser can configure the rules or conditions based on the needs of the purchaser. For example, the rules or conditions can include form data age, form data integrity, form data authenticity, form data velocity, consumer velocity, form data lineage, form data duplication, etc.

FIG. 4 illustrates a method 400 for restricting pre-audit access to suppliers, in accordance with an embodiment of the invention. The server of FIG. 2 or pre-audit module of FIG. 1 can be configured to execute the method steps shown in FIG. 4 in some embodiments. At 402, the server can provide a client device (or purchaser) with a list of form data suppliers. At 404, based on the list, the purchaser can select from the list the form data suppliers that can pre-audit the purchaser. The purchaser can select individual suppliers, a group of suppliers, all suppliers, etc. At 406, based on the selection, the server restricts one or more suppliers from performing a pre-audit of the form data against the rules or conditions of the purchaser.

FIG. 5 illustrates a method 500 for pre-auditing form data, in accordance with an embodiment of the present invention. For example, the steps shown in FIG. 5 allow the supplier to pre-audit form data to determine whether a purchaser will accept the form data prior to delivering the form data to the purchaser. The server of FIG. 2 or pre-audit module of FIG. 1 can be configured to execute the method steps shown in FIG. 5 in some embodiments. At 502, the server receives form data from a supplier prior to the form data being delivered to a purchaser (or client). At 504, the server compares the form data with rules or conditions set by the purchaser. At 506, the server transmits a response message to the supplier. The response message includes one or more results and one or more descriptions related to the one or more results. In other words, the one or more descriptions pertain to what the purchaser thinks of the form data without the purchaser actually viewing the form data.

FIG. 6 illustrates a method 600 for pre-auditing form data, in accordance with an embodiment of the present invention. For example, the steps shown in FIG. 6 allow a purchaser to set rules or conditions, as well as change the rules or conditions, using a common interface without having to interface or integrate with each supplier. The server of FIG. 2 or pre-audit module of FIG. 1 can be configured to execute the method steps shown in FIG. 6 in some embodiments.

At 602, the server receives form data from a supplier, and the server determines which purchaser has given pre-audit access to the supplier at 604. Based on which purchaser has given pre-audit access to the supplier, the server compares at 606 the form data with the rules or conditions of each purchaser that has given pre-audit access. Based on the comparison, the server at 608 transmits a response message to the supplier indicating which purchaser is interested in or will purchase the form data. In the alternative, the response message may indicate which buyer is not interested in purchasing the form data and also include reasons for not purchasing the form data.

The method steps shown in FIGS. 3-6 may be performed, in part, by a computer program, encoding instructions for a nonlinear adaptive processor to cause at least the methods described in FIGS. 3-6 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 3-6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One or more embodiments described herein pertain to a system, apparatus, and method that allow a supplier of form data to pre-audit the form data to determine whether a purchaser will purchase the form data. In other words, the system, apparatus, and method may allow the supplier to pre-audit the form data against rules or conditions set by the purchaser. This prevents the purchaser from being exposed to the form data of the supplier, removing the risk for the supplier of its form data being utilized by the purchaser without the purchaser paying for the data.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving data associated with a lead from a lead supplier prior to the data associated with the lead being delivered to a lead purchaser;
comparing the data associated with the lead with rules or conditions set by the lead purchaser; and
transmitting a response message to the lead supplier, wherein the response message comprises one or more results and one or more descriptions related to the one or more results, wherein
the comparing of the data associated with the lead comprises comparing the data associated with the lead and other data with the rules or conditions set by the lead purchaser, the other data being associated with an event that created the data associated with the lead.

2. The computer-implemented method of claim 1, further comprising:
receiving, from the lead purchaser, the rules or conditions in order to perform a pre-audit of the data associated with the lead.

3. The computer-implemented method of claim 1, further comprising:
receiving a message, from the lead purchaser, to modify the rules or conditions that were previously set by the lead purchaser; and
modifying the rules or conditions based on the message received from the lead purchaser.

4. The computer-implemented method of claim 1, wherein the one or more results comprise a positive result or a negative result.

5. The computer-implemented method of claim 4, wherein, when the result is a negative result, the one or more descriptions comprise the one or more rules or conditions that return the negative result.

6. The computer-implemented method of claim 1, further comprising:
restricting access to one or more lead suppliers to prevent the one or more lead suppliers from pre-auditing the data associated with the lead against the rules or conditions set by the lead purchaser.

7. The computer-implemented method of claim 6, wherein the restricting of access to the one or more lead suppliers comprises transmitting a list of lead suppliers of data associated with the lead to the lead purchaser.

8. The computer-implemented method of claim 7, wherein the restricting of access to the one or more lead suppliers comprises, based on the list of the lead suppliers, receiving, from the lead purchaser, a list of approved lead suppliers that can pre-audit data associated with the lead against the rules or conditions set by the lead purchaser.

9. The computer-implemented method of claim 1, further comprising:
when the lead purchaser has not restricted access to one or more lead suppliers, setting a permission level of the one or more lead suppliers such that the one or more lead suppliers are configured to transmit a message to the lead purchaser,
wherein the message comprises an indication of an intent to supply the data associated with the lead.

10. An apparatus, comprising:
a processor and memory comprising a set of instructions, wherein the set of instructions is configured to cause the processor to:
receive data associated with a lead from a lead supplier prior to the data associated with the lead being delivered to one or more lead purchasers;
compare the data associated with the lead with rules or conditions set by the one or more lead purchasers; and
transmit a response message to the lead supplier, wherein the response message comprises one or more results and one or more descriptions related to the one or more results, wherein
the set of instructions is further configured to cause the processor to compare the data associated with the lead and other data with the rules or conditions set by the lead purchaser, the other data being associated with an event that created the data associated with the lead.

11. The apparatus of claim 10, wherein the set of instructions are further configured to cause the processor to:
receive, from the one or more lead purchasers, the rules or conditions in order to perform a pre-audit of the data associated with the lead.

12. The apparatus of claim 10, wherein the set of instructions is further configured to cause the processor to:
receive a message, from the one or more lead purchasers, to modify the rules or conditions that were previously set by the one or more lead purchasers; and
modify the rules or conditions based on the message received from the one or more lead purchasers.

13. The apparatus of claim 10, wherein the one or more results comprise a positive result or a negative result.

14. The apparatus of claim 13, wherein, when the result is a negative result, the one or more descriptions comprise the one or more rules or conditions that return the negative result.

15. The apparatus of claim 10, wherein the set of instructions is further configured to cause the processor to:
transmit a list of lead suppliers of data associated with the lead to the one or more lead purchasers.

16. The apparatus of claim 15, wherein the set of instructions is further configured to cause the processor to:
based on the list of the lead suppliers, receive, from the one or more lead purchasers, a list of approved lead suppliers that can pre-audit data associated with the lead against the rules or conditions set by the one or more lead purchasers.

17. The apparatus of claim 16, wherein the set of instructions is further configured to cause the processor to:
restrict access to one or more lead suppliers to prevent the one or more lead suppliers from pre-auditing the data associated with the lead against the rules or conditions set by the one or more lead purchasers.

18. The apparatus of claim 10, wherein the set of instructions is further configured to cause the processor to:
when the one or more lead purchasers have not restricted access to the one or more lead suppliers, set a permission level of the one or more lead suppliers such that the one or more lead suppliers are configured to transmit a message to one or more lead purchasers,
wherein the message comprises an indication of an intent to supply the data associated with the lead.

* * * * *